United States Patent Office 3,316,258
Patented Apr. 25, 1967

3,316,258
4-OXO-5-MORPHOLINO AND PHTHALIMIDO BENZOTHIOPHENES
Joseph Sam, Oxford, Miss. 38655
No Drawing. Filed Nov. 16, 1964, Ser. No. 411,565
5 Claims. (Cl. 260—247.1)

This invention relates to novel compounds. More particularly, this invention relates to novel compounds having analgesic activity.

There is provided according to the present invention compounds of the formula (I)

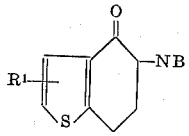

wherein $R^1$ is a member selected from the group consisting of hydrogen, chloro, bromo, fluoro, iodo, trifluoromethyl, nitro, (lower)alkyl, allyl, and radicals of the formula (II)

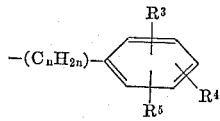

wherein $n$ is a whole integer from 0 to 3 inclusive, $R^3$, $R^4$ and $R^5$ are each a member selected from the group consisting of hydrogen, chloro, bromo, iodo, fluoro, trifluoromethyl, nitro, (lower)alkyl, (lower)alkoxy, (lower)alkylthio, alkyl and di(lower)alkylamino, and wherein NB is a member selected from the group consisting of morpholino and phthalimido; and the pharmaceutically acceptable nontoxic acid addition salts thereof.

The term "(lower)alkyl" as used herein means both straight and branched chain saturated aliphatic hydrocarbon radicals having from 1 to 10 carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g., "(lower) alkoxy," it refers to the alkyl portion of such group which is therefore as described above in connection with (lower)alkyl.

The pharmaceutically acceptable nontoxic salts of the foregoing bases include the organic and inorganic acid addition salts prepared by simple addition of one equivalent of acid to the base. These salts include those prepared from acids such as hydrochloric, sulfuric, sulfamic, tartaric, hydrobromic, hydriodic, glycolic, citric, maleic, phosphoric, succinic, acetic, and the like.

A preferred group of compounds of Formula I are those of the formula (III)

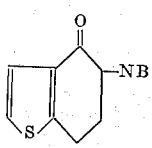

wherein NB is as defined above.

Representative of the novel compounds of this invention are the following compounds, 4-keto-5-morpholino-4,5,6,7-tetrahydrothionaphthene,
4-keto-5-phthalimido-4,5,6,7-tetrahydrothionaphthene,
2-bromo-4-keto-5-morpholino-4,5,6,7-tetrahydrothionaphthene,
3-methyl-4-keto-5-morpholino-4,5,6,7-tetrahydrothionaphthene,
2-trifluoromethyl-4-keto-5-morpholino-4,5,6,7-tetrahydrothionaphthene,
3-trifluoromethyl-4-keto-5-phthalimido-4,5,6,7-tetrahydrothionaphthene,
2-nitro-4-keto-5-morpholino-4,5,6,7-tetrahydrothionaphthene,
3-chloro-4-keto-5-phthalimido-4,5,6,7-tetrahydrothionaphthene,
3-isopropyl-4-keto-5-phthalimido-4,5,6,7-tetrahydrothionaphthene,
3-phenyl-4-keto-5-phthalimido-4,5,6,7-tetrahydrothionaphthene,
3-phenyl-4-keto-5-morpholino-4,5,6,7-tetrahydrothionaphthene,
2-fluoro-4-keto-5-morpholino-4,5,6,7-tetrahydrothionaphthene,
3-(2-chlorophenyl)-4-keto-5-phthalimido-4,5,6,7-tetrahydrothionaphthene,
3-benzyl-4-keto-5-phthalimido-4,5,6,7-tetrahydrothionaphthene,
3-(4-methylbenzyl)-4-keto-5-morpholino-4,5,6,7-tetrahydrothionaphthene,
2-(3,6-dimethylphenyl)-4-keto-5-morpholino-4,5,6,7-tetrahydrothionaphthene,
3-(2,5-dichlorophenyl)-4-keto-5-morpholino-4,5,6,7-tetrahydrothionaphthene,
2-allyl-4-keto-5-phthalimido-4,5,6,7-tetrahydrothionaphthene,
2-(4-methoxyphenyl)-4-keto-5-phthalimido-4,5,6,7-tetrahydrothionaphthene,
2-(2,3,4-trichlorophenyl)-4-keto-5-morpholino-4,5,6,7-tetrahydrothionaphthene,
3-(4-trifluoromethylbenzyl)-4-keto-5-phthalimido-4,5,6,7-tetrahydrothionaphthene,
2-(2-nitrophenyl)-4-keto-5-morpholino-4,5,6,7-tetrahydrothionaphthene,
3-(2,5-dibromophenyl)-4-keto-5-phthalimido-4,5,6,7-tetrahydrothionaphthene,
3-(4-chlorophenyl)-4-keto-5-phthalimido-4,5,6,7-tetrahydrothionaphthene,
3-(4-allylphenyl)-4-keto-5-morpholino-4,5,6,7-tetrahydrothionaphthene,
3-(2-dimethylaminophenyl)-4-keto-5-phthalimido-4,5,6,7-tetrahydrothionaphthene,
2-(2-fluoro-4-trifluoromethylphenyl)-4-keto-5-phthalimido-4,5,6,7-tetrahydrothionaphthene,
3-(4-iodophenyl)-4-keto-5-morpholino-4,5,6,7-tetrahydrothionaphthene,
2-(4-methylthiobenzyl)-4-keto-5-morpholino-4,5,6,7-tetrahydrothionaphthene,
3-ethyl-4-keto-5-phthalimido-4,5,6,7-tetrahydrothionaphthene,
2-chloro-4-keto-5-morpholino-4,5,6,7-tetrahydrothionaphthene,
2-chloro-4-keto-phthalimido-4,5,6,7-tetrahydrothionaphthene,
2-trifluoromethyl-4-keto-5-phthalimido-4,5,6,7-tetrahydrothionaphthene, and
3-trifluoromethyl-4-keto-5-morpholino-4,5,6,7-tetrahydrothionaphthene.

The compounds of this invention are valuable pharmaceutical agents. They produce pain relief which makes the compounds useful as analgesic agents.

The compounds of the present invention were tested for analgesic activity by the phenylquinone test of Sigmund et al., Proc. Soc. Expt'l Biol. and Med., 95, 729 (1957) in which an analgesic reduces the induced writhing of the mice. The compounds were administered at dosages of 50 mgm./kg. p.o. in mice, 50 minutes before the phenyl-p-quinone was injected. The reduction in induced writhing was determined at the end of the first hour. When, for example, 4-keto-5-morpholino-4,5,6,7-tetrahydrothionaphthene hydrochloride was tested, the reduction in induced writhing at the end of the first hour was found to be greater than 30%. This indicated that 4-keto-5-morpholino-4,5,6,7-tetrahydrothionaphthene hydrochloride is an analgesic agent.

The compounds of the present invention can be compounded and formulated into pharmaceutical preparations for oral, parenteral or topical administration with organic or inorganic solid materials or liquids that are pharmaceutically acceptable carriers. The compositions may take the form of tablets, effervescent tablets, powders, granules, capsules (both hard and soft shell capsules), suspensions, solutions, emulsions, injectable solutions and suspensions and the like. Such compositions are considered within the scope of this invention.

The compounds of the present invention are prepared by the following series of reactions. First a 4-keto-4,5,6,7-tetrahydrothionaphthene of the formula (IV) 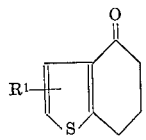

wherein $R^1$ is as defined above, is brominated to produce a 5-bromo-4-keto-4,5,6,7-tetrahydrothionaphthene of the formula (V) 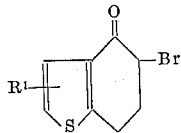

wherein $R^1$ is as defined above. The reaction is preferably carried out at about 0° C. and in the presence of a solvent such as anhydrous ether. The procedure for this reaction is generally described by A. L. Wilds, Journal of the American Chemical Society, vol. 64, p. 1421 (1942), and is illustrated by Example 1. The 5-bromo-4-keto-4,5,6,7-tetrahydrothionaphthene then is condensed with morpholine or phthalimide to produce the 4-keto-5-morpholino- or phthalimido-4,5,6,7 - tetrahydrothionaphthene compounds of this invention, and which are disclosed in Formula I. This reaction is carried out under pressure and preferably at about 100° C., and is illustrated by Example 3. The general procedure for carrying out the reaction is described by Takahashi et al., J. Pharm. Soc. (Japan), vol. 76, pp. 56–60 (1956), and Chemical Abstracts, 50:12849b (1956).

The 4-keto-5-phthalimido-4,5,6,7 - tetrahydrothionaphthene may also be prepared by the condensation of potassium phthalimide with 5-bromo-4-keto-4,5,6,7-tetrahydrothionaphthene as illustrated by Example 2. This reaction is conveniently carried out at room temperature and at atmospheric pressure, and is described generally by Sheehan et al., Journal of the American Chemical Society, vol. 72, p. 2786 (1950).

The starting materials used in the process described herein are compounds which are either commercially available, well-known in the art, or easily prepared in accordance with standard organic procedures previously described in the chemical literature. The preparation of 4-keto-4,5,6,7-tetrahydrothionaphthene is described by Fieser et al., Journal of the American Chemical Society, vol. 57, p. 1611 (1935).

The compositions of this invention when administered orally or parenterally in an effective amount are effective in the alleviation of pain.

The following examples are intended to illustrate the invention described herein without unduly restricting it.

EXAMPLE 1

Preparation of 5-bromo-4-keto-4,5,6,7-tetrahydrothionaphthene

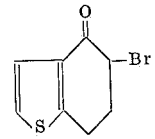

To a solution of 5.66 gm. (0.037 mol) of 4-keto-4,5,6,7-tetrahydrothionaphthene in 400 ml. of anhydrous ether kept at 0° C. was added dropwise with stirring 5.33 gm. (0.033 mol) of bromine. Thereafter the mixture was stirred at room temperature until the yellow insoluble addition complex which had formed dissolved completely. The ethereal solution was poured into ice water, separated from the aqueous layer, and washed with water and dilute sodium bicarbonate solution, respectively. Evaporation of the ether left 8 gm. of product, 5-bromo-4-keto-4,5,6,7-tetrahydrothionaphthene, which was recrystallized from petroleum ether (boiling point range 30–60° C.), found to have a melting point of 79–81° C., and to have the following elemental analysis.

Analysis.—Calc'd for $C_8H_7BrOS$: C, 41.59; H, 3.05; Br, 34.57; S, 13.88. Found: C, 41.51; H, 3.15; Br, 34.37; S, 13.80.

EXAMPLE 2

Preparation of 4-keto-5-phthalimido-4,5,6,7-tetrahydrothionaphthene

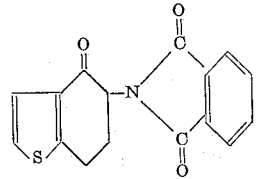

Potassium phthalimide (1.98 gm., 0.0107 mol) was added in one portion to a stirred solution of 2.31 gm. (0.01 mol) of 5-bromo-4-keto-4,5,6,7-tetrahydrothionaphthene in 20 ml. of N,N-dimethylformamide. After the mixture was stirred for 12 hours at room temperature, 15 ml. of chloroform were added and the mixture poured into 50 ml. of water. The aqueous phase was separated and extracted with two 5-ml. portions of chloroform. The combined chloroform extract was washed with 10 ml. of 0.2 N sodium hydroxide and 10 ml. of water and thereafter dried over anhydrous sodium sulfate. After removal of the chloroform by distillation, the residual solid was triturated with 20 ml. of ether. The solid, 4-keto-5-phthalimido-4,5,6,7-tetrahydrothionaphthene (0.5 gm.) was recrystallized several times from absolute ethanol, found to have a melting point of 183–185° C., and the following elemental analysis.

Analysis.—Calc'd for $C_{16}H_{11}NO_3S$: C, 64.45; H, 3.73; N, 4.71; S, 10.78. Found: C, 64.79; H, 3.82; N, 4.56; S, 10.66.

EXAMPLE 3

Preparation of 4-keto-5-morpholino-4,5,6,7-tetrahydrothionaphthene hydrochloride

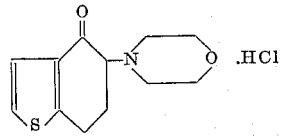

Two and three-tenths grams (0.01 mol) of 5-bromo-4-keto-4,5,6,7-tetrahydrothionaphthene, 1.642 gm. (0.02 mol) of morpholine, and 30 ml. of anhydrous benzene contained in a pressure bottle were heated in an oil bath for 3 hours at 100° C. The precipitated morpholine hydrochloride was removed by filtration and the benzene distilled in vacuo. The residue was treated with 10% hydrochloric acid and extracted with ether. The aqueous layer was neutralized with excess sodium bicarbonate and extracted with ether. The ethereal solution was dried over sodium sulfate and thereafter treated with hydrogen chloride. The precipitate, 4-keto-5-morpholino-4,5,6,7 - tetrahydrothionaphthene hydrochloride (1.5 gm.), was removed by filtration and recrystallized from absolute ethanol, found to have a melting point of 205–206° C., and to have the following elemental analysis.

Analysis.—Calc'd for $C_{12}H_{16}ClNO_2S$: C, 52.62; H, 5.89; Cl, 12.95; N, 5.12; S, 11.70. Found: C, 52.84; H, 5.88; Cl, 13.01; N, 4.81; S, 11.60.

While this invention has been described and exemplified in terms of its preferred embodiment, those skilled in the art will appreciate that modifications can be made without departing from the spirit and scope of this invention.

What is claimed is:

1. A compound selected from the group consisting of compounds of the formula

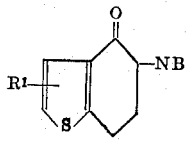

wherein $R^1$ is a member selected from the group consisting of hydrogen, chloro, bromo, fluoro, iodo, trifluoromethyl, nitro, (lower)alkyl, allyl, and radicals of the formula

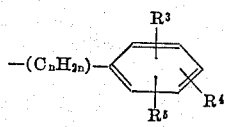

wherein $n$ is a whole integer from 0 to 3 inclusive, $R^3$, $R^4$ and $R^5$ are each a member selected from the group consisting of hydrogen, chloro, bromo, iodo, fluoro, trifluoromethyl, nitro, (lower)alkyl, (lower)alkoxy, (lower)alkylthio, allyl and di(lower)alkylamino, and wherein NB is a member selected from the group consisting of morpholino and phthalimido; and the pharmaceutically acceptable nontoxic acid addition salts thereof.

2. A compound selected from the group consisting of compounds of the formula

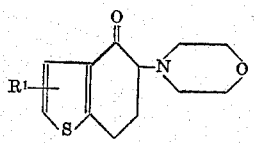

wherein $R^1$ is a member selected from the group consisting of hydrogen, chloro, bromo, fluoro, iodo, trifluoromethyl, nitro, (lower)alkyl, allyl, and radicals of the formula

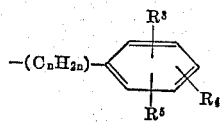

wherein $n$ is a whole integer from 0 to 3 inclusive, $R^3$, $R^4$ and $R^5$ are each a member selected from the group consisting of hydrogen, chloro, bromo, iodo, fluoro, trifluoromethyl, nitro, (lower)alkyl, (lower)alkoxy, (lower)alkylthio, allyl and di(lower)alkylamino; and the pharmaceutically acceptable nontoxic acid addition salts thereof.

3. A compound selected from the group consisting of compounds of the formula

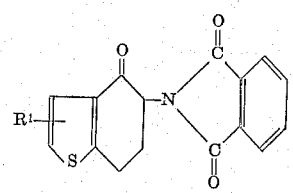

wherein $R^1$ is a member selected from the group consisting of hydrogen, chloro, bromo, fluoro, iodo, trifluoromethyl, nitro, (lower)alkyl, allyl, and radicals of the formula

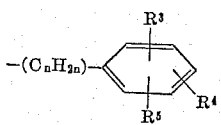

wherein $n$ is a whole integer from 0 to 3 inclusive, $R^3$, $R^4$ and $R^5$ are each a member selected from the group consisting of hydrogen, chloro, bromo, iodo, fluoro, trifluoromethyl, nitro, (lower)alkyl, (lower)alkoxy, (lower)alkylthio, allyl and di(lower)alkylamino; and the pharmaceutically acceptable nontoxic acid addition salts thereof.

4. The compound having the formula

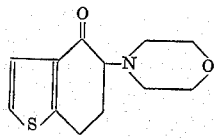

5. The compound having the formula

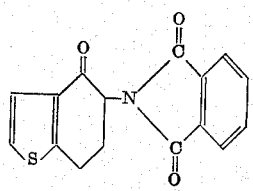

No references cited.

ALEX MAZEL, Primary Examiner.
JOSE TOVAR, Assistant Examiner.